(12) United States Patent
Du

(10) Patent No.: US 12,479,832 B2
(45) Date of Patent: Nov. 25, 2025

(54) LIVER TARGETING DRUG, PHARMACEUTICAL COMPOSITION AND USE THEREOF

(71) Applicants: Jessica Xinyun Du, Redwood City, CA (US); Qiang Huang, Zhangjiagang (CN)

(72) Inventor: Jessica Xinyun Du, Redwood City, CA (US)

(73) Assignees: Jessica Xinyun Du, Redwood City, CA (US); Qiang Huang, Zhangjiagang (CN)

( * ) Notice: Subject to any disclaimer, the term of this patent is extended or adjusted under 35 U.S.C. 154(b) by 828 days.

(21) Appl. No.: 17/772,264

(22) PCT Filed: Nov. 2, 2020

(86) PCT No.: PCT/CN2020/125832
§ 371 (c)(1),
(2) Date: Apr. 27, 2022

(87) PCT Pub. No.: WO2021/088762
PCT Pub. Date: May 14, 2021

(65) Prior Publication Data
US 2022/0396566 A1     Dec. 15, 2022

(30) Foreign Application Priority Data
Nov. 7, 2019   (CN) .......................... 201911083040.6

(51) Int. Cl.
C07D 403/14     (2006.01)
A61P 1/16       (2006.01)

(52) U.S. Cl.
CPC .............. *C07D 403/14* (2013.01); *A61P 1/16* (2018.01)

(58) Field of Classification Search
None
See application file for complete search history.

(56) References Cited

U.S. PATENT DOCUMENTS

2018/0303897 A1 * 10/2018 Condon .................. A61P 37/06

FOREIGN PATENT DOCUMENTS

| CN | 102471275 A | 5/2012 |
|---|---|---|
| WO | 2013049350 A1 | 4/2013 |

OTHER PUBLICATIONS

Fanning, Gregory C.; Therapeutic strategies for hepatitis B virus infection: towards a cure; Nature Reviews; Aug. 27, 2019; 18 pgs.
Ebert, Gregor, et al.; Eliminating hepatitis B by antagonizing cellular inhibitors of apoptosis; PNAS, vol. 112, No. 18; pgs. 5803-5808; May 5, 2015.
Jiang, Pan-ruo, et al.; Anti-hepatoma effects of Smac analogue Birinapant and its related molecular mechanism; Chin J Appl Physiol, 2018, 34(6); pp. 524-529.
Steinhardt, James J.; Inhibiting CARD11 translation during BCR activation by targeting the eIF4A RNA helicase; Blood; vol. 124, No. 25; Dec. 22, 2014, pp. 3758-3767.
Mo, Xiulei, et al.; HTIP: High-Throughput Immunomodulator Phenotypic Screening Platform to Reveal IAP Antagonists as Anti-cancer Immune Enhancers; Cell Chemical Biology, 26, pp. 331-339; Mar. 21, 2019.
Deng, Yijun, et al.; Process Development and Synthesis of Birinapant—Large Scale Preparation and Acid-mediated Dimerization of the Key Indole Intermediate; Organic Process Research & Development; vol. 20, No. 2, Jan. 6, 2016; 35 pgs.
International Search Report issued in corresponding International Application No. PCT/CN2020/125832; mailed Feb. 5, 2021; 9 pgs.

* cited by examiner

*Primary Examiner* — Brian J Davis
(74) *Attorney, Agent, or Firm* — HAUPTMAN HAM, LLP

(57) ABSTRACT

Disclosed are a compound represented by formula I or a pharmaceutically acceptable salt thereof, and a pharmaceutical composition and use thereof. The compound has significant liver targeting characteristics, and can reduce the drug concentration in the circulating system while improving the efficacy, thereby reducing the toxic and side effects.

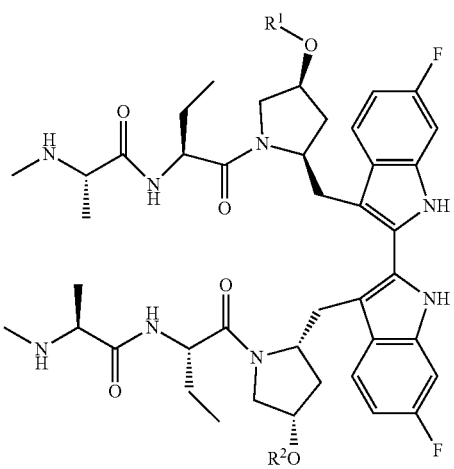

7 Claims, 1 Drawing Sheet

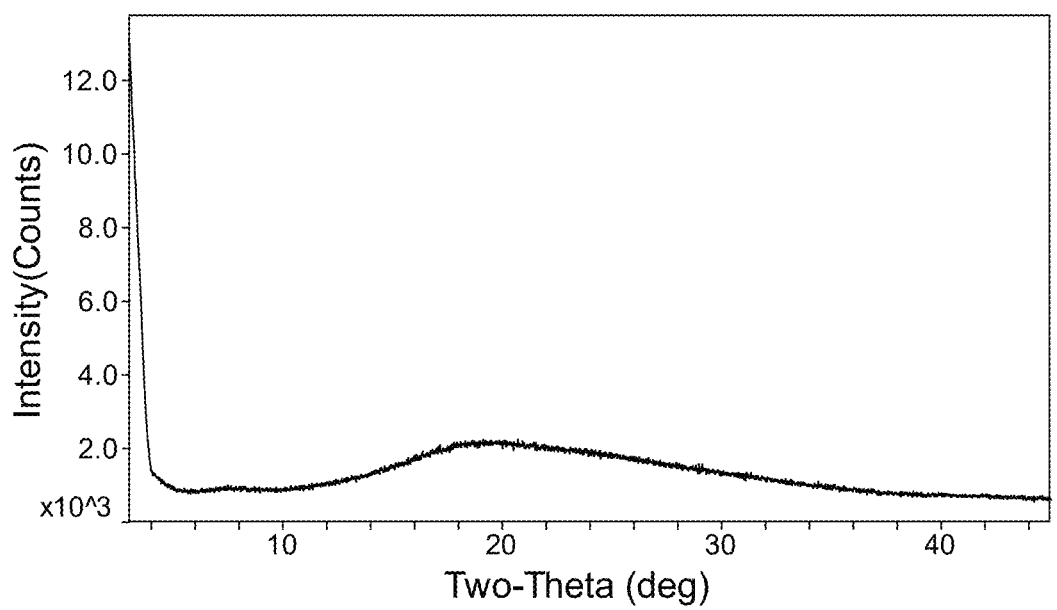

LIVER TARGETING DRUG, PHARMACEUTICAL COMPOSITION AND USE THEREOF

RELATED APPLICATIONS

The present application is a U.S. National Phase of International Application Number PCT/CN2020/125832 filed Nov. 2, 2020 and claims priority to Chinse application No. 201911083040.6 filed Nov. 7, 2019.

TECHNICAL FIELD

The present disclosure relates to a liver targeting drug, a pharmaceutical composition thereof, and use thereof.

BACKGROUND

Chronic hepatitis B virus (HBV) infection is a common cause of liver diseases around the world. In China, the number of new hepatitis B virus infections is up to 1 million or more every year, with a total of 90 million infections. The World Health Organization (WHO) estimates that there are approximately 257 million HBV-infected patients worldwide. More than 650,000 people die each year from HBV-associated end-stage liver diseases, including liver failure, cirrhosis, and hepatocellular carcinoma (HCC). Currently, vaccines and nucleoside (NA) or nucleotide (NUC) drugs can not only reduce new infection rates, but also delay the progression of liver diseases in HBV patients who adhere to a long-term viral suppressive therapy. The goal of treatment for chronic hepatitis B is to delay or decrease the onset of cirrhosis decompensation, liver failure and HCC, thereby improving quality of life and extending lifetime of patients.

Negative conversion of hepatitis B surface antigen (HBsAg) is related to the improved liver function, improved histopathology, and improved long-term prognosis. It is now an ideal therapeutic goal recommended by the latest guidelines for the prevention and treatment of chronic hepatitis B at home and abroad, i.e., functional cure or clinical cure of hepatitis B. However, direct antiviral agents (DAAs) [such as a nucleoside (nucleotide) analogue (NA)] or immuno-modulators [such as pegylated interferon alpha (PEG-IFN)], when used alone, have limited effect on clinical cure. Theoretically, NA and PEG-IFN exert different antiviral effects against HBV, and when combined rationally, they can produce a synergistic and complementary effect. Some drugs with new mechanisms of action are now entering clinical trials, such as immune checkpoint inhibitors (anti-PD-1 or anti-CTLA-4 therapies), inhibitors of capsid assembly (AT-130, NVR-3778, JNJ6379, etc.), RNAi therapies (JNJ3989 or ARO-HBV), and inhibitors of apoptosis proteins (IAP) (such as APG-1387) (Fanning et al., Therapeutic strategies for hepatitis B virus infection: towards a cure. *Nature Reviews Drug Discovery*, 2019).

The IAP inhibitor Birinapant was reported to be effective in inhibiting hepatitis B virus, particularly replication of the hepatitis B surface antigen (HBsAg) in animal models, which is of great importance for the functional cure of hepatitis B (G. Ebert et al., PNAS 2015, 112, 5803). However, it was suspended by the FDA because of the paralysis of facial muscles it caused in patients. Clinical trials of Birinapant in cancer are ongoing, and new data has successively reported that the side effect-paralysis of facial muscles limits its Dose Limited Toxicity to 22 mg/M2 twice weekly, with a safe dose of 17 mg/M2 per week or 17 mg/M2 twice weekly (Blood 2014, 124:3758). This side effect is likely to be caused by circulatory drugs. Jiang Panruo et al. reported that Birinapant is also effective in inhibiting cIAP-1, cIAP-2 and Ras-Raf-MEK-ERK pathways, while activating the mitoglobulin-mediated endogenous apoptosis pathway, showing an anti-hepatocellular carcinoma activity (Chinese Journal of Applied Physiology, 2018, 34524); the survival in dosed mice has been significantly prolonged, and Birinapant has the potential to be developed as a therapeutic agent for liver cancer.

Birinapant is currently being tested in clinical trials for the treatment of other cancers, such as hysteroma, lymphoid leukemia, solid tumors, myelodysplasia syndrome, or head and neck tumors. The side effect-paralysis of facial muscles caused by Birinapant at high doses may have these applications limited (Blood. 2014, 124, 3758).

Recently, Mo et al. (Mo et al., Cell Chemical Biology 2019, 26, 1) have found that Birinapant could enhance the anti-cancer ability of the immune system. This would potentially expand the clinical applications of Birinapant to a variety of cancers.

SUMMARY

To address the above-mentioned problems, the inventors have conducted intensive researches on analogues of Birinapant in the hope of reducing the toxic and side effects on the circulating system while maintaining or improving the therapeutic effect. For example, the inventors have prepared the following compounds A and B, and carried out relevant pharmacokinetic tests in rats, but compounds A and B, no matter whether administered orally or by injection, have not been degraded at all by in vivo esterases to release the active drug Birinapant, and compounds A and B have been 100% excreted and recovered.

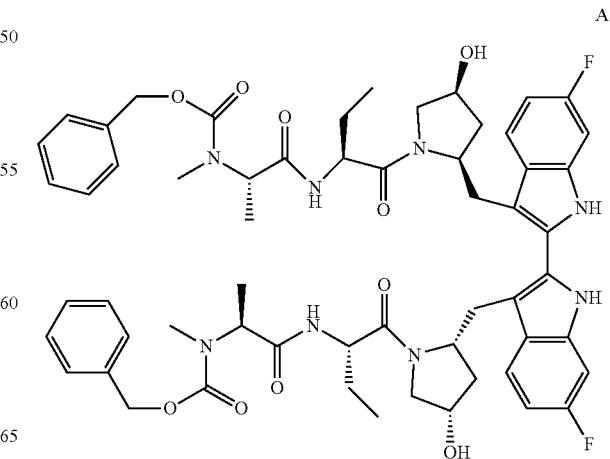

A

The inventors have conducted further studies and have unexpectedly found that the compound of formula I, or the pharmaceutically acceptable salt thereof, can not only be effectively degraded by liver esterase into Birinapant, but also significantly improve the ability of the liver to enrich drugs. It has significant liver targeting characteristics, which is quite beneficial to reduce the drug concentration in the circulating system, thereby reducing the toxic and side effects of the drug on the organs related to the circulating system, including avoidance of the side effect-paralysis of facial muscles, thereby significantly improving the drug tolerance.

To this end, the present disclosure provides a compound represented by formula I:

or a pharmaceutically acceptable salt thereof,
wherein:
$R^1$ and $R^2$ are each independently selected from: hydrogen, —COR', —CONR'R", or —COOR', where $R^1$ and $R^2$ are not hydrogen at the same time;
optionally, $R^1$ and $R^2$ are each independently selected from: hydrogen or —COR', where $R^1$ and $R^2$ are not hydrogen at the same time;
R', at each occurrence, and R" are each independently selected from, but not limited to: hydrogen, alkyl or substituted alkyl, alkenyl or substituted alkenyl, alkynyl or substituted alkynyl, cycloalkyl or substituted cycloalkyl, aryl or substituted aryl, heteroaryl or substituted heteroaryl, heterocyclyl or substituted heterocyclyl; and substituents of each of the substituted alkyl, substituted cycloalkyl, substituted aryl, substituted heteroaryl, substituted alkenyl, substituted alkynyl, or substituted heterocyclyl are each independently selected from, but not limited to: halogen, cyano, amino, nitro, hydroxyl, alkyl, alkoxyl, modified alkyl, and amino acidyl.

Optionally, the "halogen" is selected from, but not limited to: F, Cl, Br, or I;
optionally, "alkyl" in the "alkyl" or "alkoxyl" is, but not limited to, $C_1$-$C_{20}$ linear or branched alkyl, optionally, but not limited to, $C_1$-$C_{10}$ linear or branched alkyl, optionally, but not limited to, $C_1$-$C_5$ linear or branched alkyl, or optionally selected from, but not limited to: methyl, ethyl, n-propyl, isopropyl, n-butyl, isobutyl, tert-butyl, sec-butyl, and n-pentyl;
optionally, the "modified alkyl" is, but not limited to, a group resulting from substitution of one or more groups selected from —O—, —CO—, —NH$_2$, —OH, halogen, —CN, and —NO$_2$ for any carbon atom in the alkyl;
the substitution for the carbon atom refers to substitution of a corresponding group for the carbon atom, or the carbon atom together with the hydrogen atom thereon;
optionally, the "cycloalkyl" is, but not limited to, $C_3$-$C_{10}$ monocyclic or bicyclic cycloalkyl; optionally, $C_3$-$C_7$ monocyclic or bicyclic cycloalkyl; optionally, $C_5$-$C_6$ monocyclic or bicyclic cycloalkyl;
optionally, the aryl is, but not limited to, 6- to 14-membered aryl; optionally, 6- to 10-membered aryl; optionally, phenyl or naphthyl;
optionally, the "heteroaryl" is, but not limited to, a 5- to 14-membered heteroaromatic ring containing 1, 2, or 3 heteroatoms selected from N, O, and S; optionally a 5- to 10-membered heteroaromatic ring;
optionally, the "heterocyclyl" is, but not limited to, a 3- to 10-membered nonaromatic heterocyclic ring containing 1, 2, or 3 heteroatoms selected from N, O, and S.

Optionally, R', at each occurrence, and R" are each independently selected from, but not limited to: hydrogen, methyl, ethyl, n-propyl, isopropyl, n-butyl, isobutyl, benzyl, sec-butyl, n-pentyl, cyclopropyl, cyclobutyl, cyclopentyl, cyclohexyl, phenyl and substituted phenyl, wherein a substituent of the phenyl is selected from F, Br, Cl, I, cyano, amino, nitro, hydroxyl, $C_1$-$C_5$ linear or branched alkyl, $C_1$-$C_5$ linear or branched alkoxyl, and natural amino acidyl; and optionally, $R^1$ and $R^2$ are each independently selected from, but not limited to: formyl, acetyl, propionyl, isopropionyl, butyryl, isobutyryl, benzoyl, and substituted benzoyl, wherein a substituent of the phenyl is selected from F, Br, Cl, I, cyano, amino, nitro, hydroxyl, $C_1$-$C_5$ linear or branched alkyl, $C_1$-$C_5$ linear or branched alkoxyl, and natural amino acidyl.

Optionally, the compound of formula I is preferably selected from the following compounds:

I-1
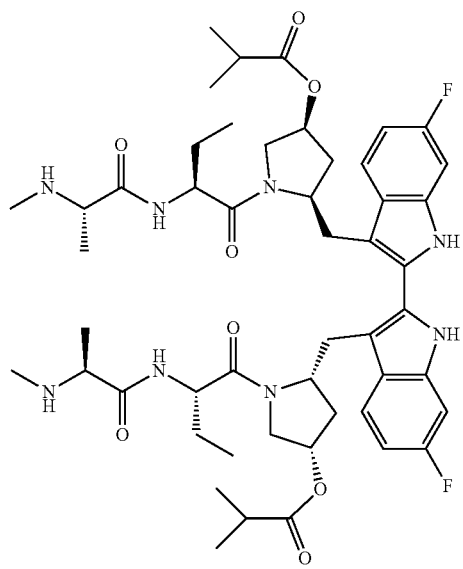
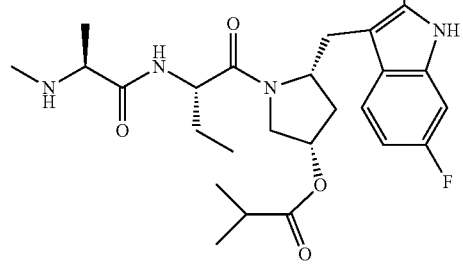
I-3
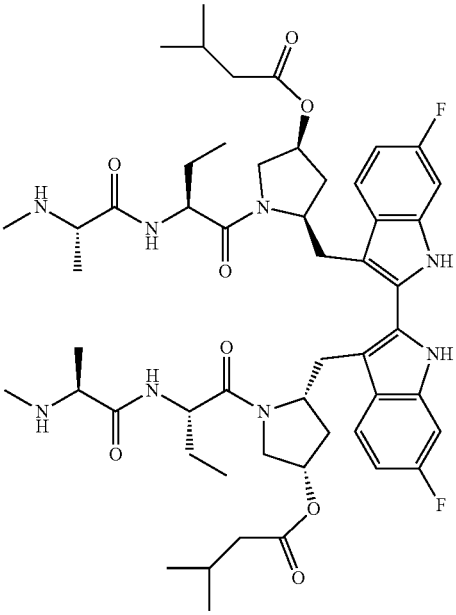
I-2
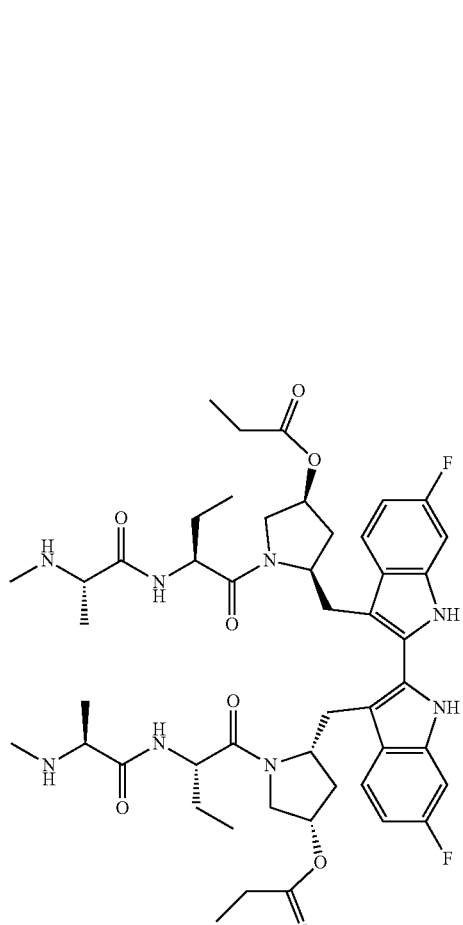
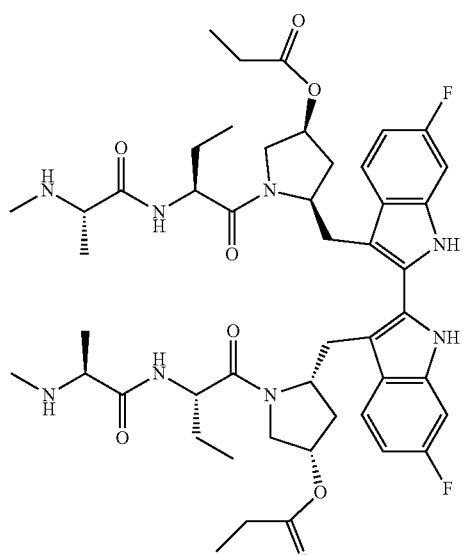
I-4
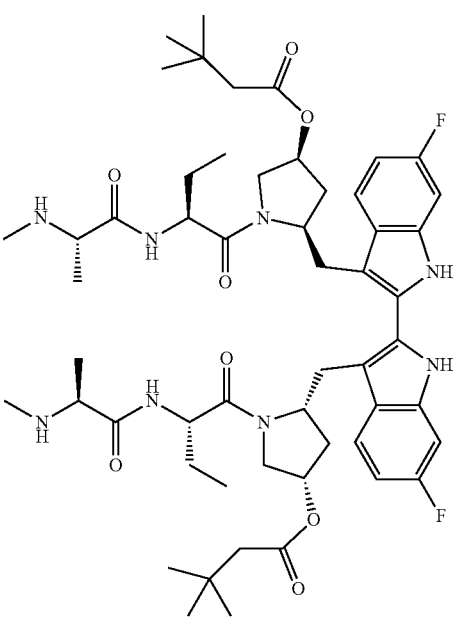

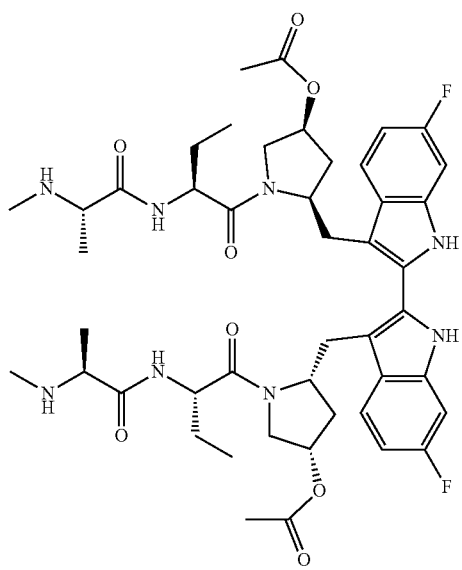

I-5

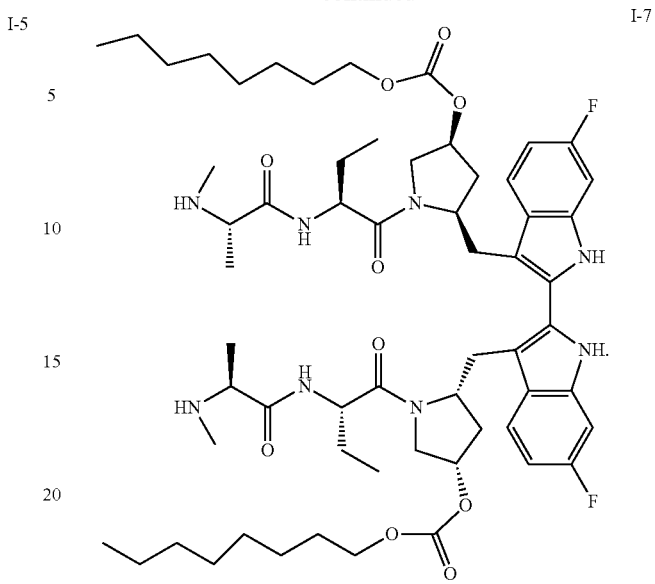

I-7

Optionally, the pharmaceutically acceptable salt includes a salt formed of a compound of formula I and an acid; optionally, the acid includes an inorganic acid and an organic acid; optionally, the inorganic acid includes, but not limited to, hydrochloric acid, hydrobromic acid, hydroiodic acid, sulfuric acid, nitric acid, phosphoric acid, and carbonic acid; and optionally, the organic acid includes formic acid, ascorbic acid, acetic acid, propionic acid, oxalic acid, malonic acid, succinic acid, fumaric acid, maleic acid, lactic acid, malic acid, citric acid, tartaric acid, gluconic acid, hydrogen tartaric acid, glucuronic acid, picric acid, methanesulfonic acid, ethanesulfonic acid, p-toluenesulfonic acid, benzoic acid, benzenesulfonic acid, p-bromobenzenesulfonic acid, glutamic acid, salicylic acid, and pamoic acid, and optionally hydrochloride.

Optionally, the pharmaceutically acceptable salt of the compound of formula I is selected from the following compounds: a compound of formula I-5-S, a compound of formula I-5-R, a compound of formula I-6-S, and a compound of formula I-7-S:

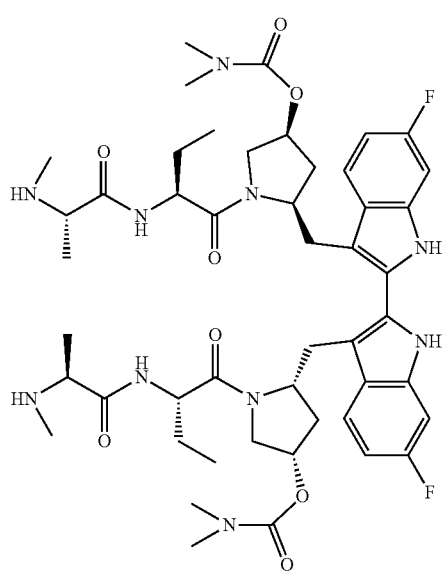

I-6

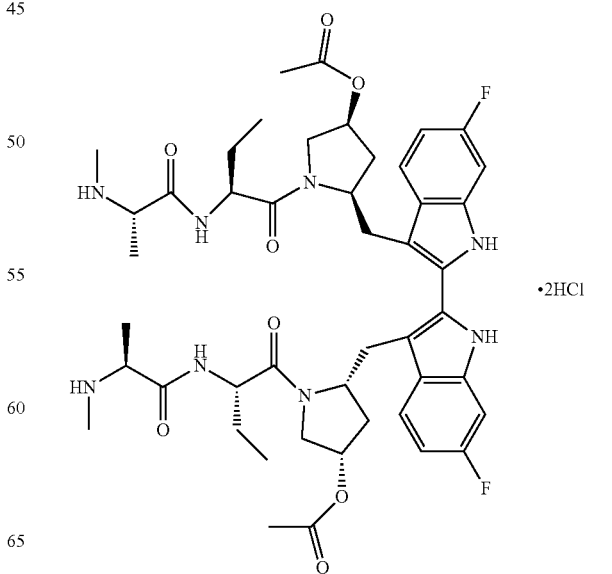

I-5-S

-continued

I-6-S

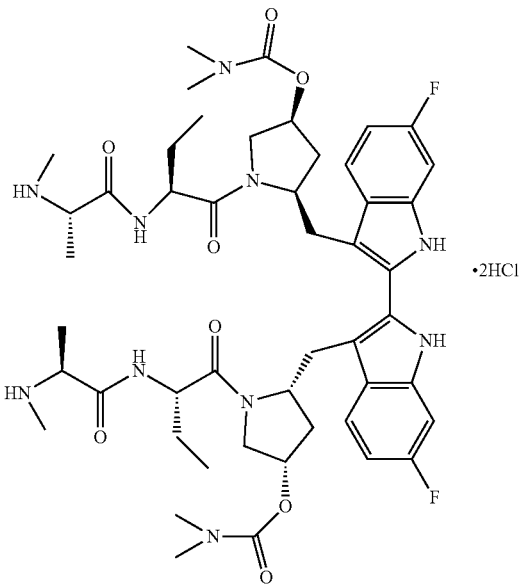

·2HCl

I-7-S

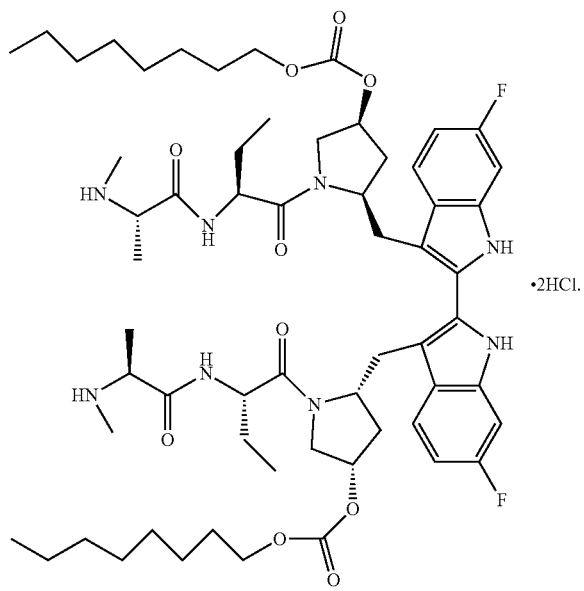

·2HCl.

Optionally, the compound of formula I-5-S is a compound I-5-S in an amorphous form, and optionally, a compound I-5-S has a CuKα-XPRD diffraction pattern as shown in the FIGURE.

On the other aspect, provided is a pharmaceutical composition, comprising one or more of a therapeutically effective dose of a compound of formula I, or a pharmaceutically acceptable salt thereof, and optionally a pharmaceutically acceptable carrier.

Optionally, a dosage form of the pharmaceutical composition includes an oral preparation and an injection preparation;

optionally, the oral preparation includes a solid preparation and a liquid preparation;

optionally, the solid preparation includes tablets, powders, granules, and capsules; and optionally, the liquid preparation includes water or oil suspensions, and syrups.

On the other aspect, provided is use of the compound of formula I described above or a pharmaceutically acceptable salt thereof, or a pharmaceutical composition thereof in the preparation of a medicament for treating liver diseases; optionally, the liver diseases include liver cancer and hepatitis B.

On the other aspect, provided is use of the compound of formula I or a pharmaceutically acceptable salt thereof, or a pharmaceutical composition thereof in the preparation of a medicament for treating hysteroma, lymphoid leukemia, solid tumors, myelodysplasia syndrome, or head and neck tumors.

On the other aspect, provided is use of the compound of formula I or a pharmaceutically acceptable salt thereof, or a pharmaceutical composition thereof in the preparation of a medicament for inhibiting an action of an apoptosis protein.

On the other aspect, provided is use of the compound of formula I or a pharmaceutically acceptable salt thereof, or a pharmaceutical composition thereof in the preparation of a medicament for use in an immune system to fight against cancers.

BRIEF DESCRIPTION OF THE DRAWINGS

The FIGURE is a CuKα-XPRD diffraction pattern of the compound I-5-S in Example 1.

DETAILED DESCRIPTION

The specific embodiments of the present disclosure will be elaborated below. It should be appreciated that the specific embodiments described herein are merely intended to exemplarily illustrate, and not limit the present disclosure.

Example 1. Preparation of Compounds (1) Preparation of Compound I-5-1:

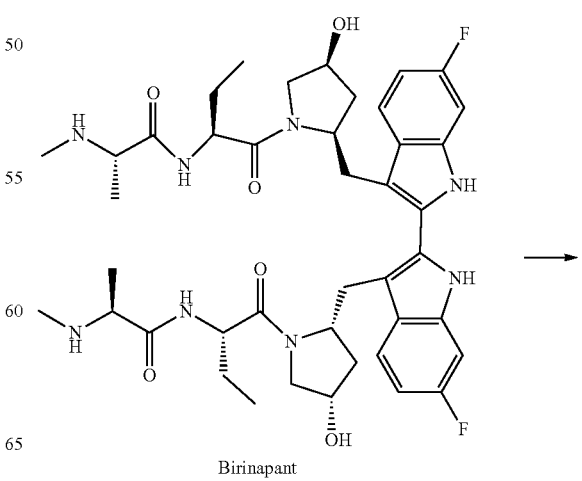

Birinapant

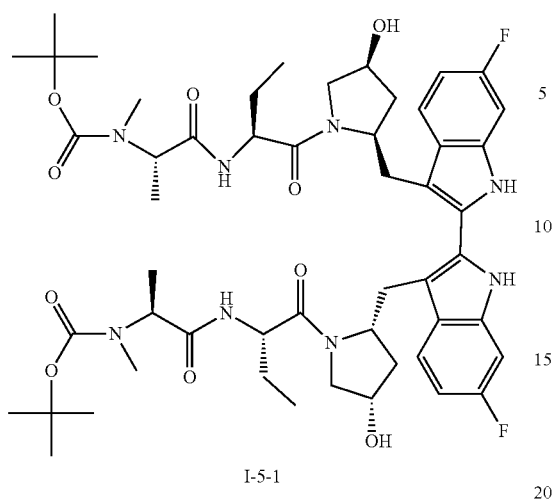

I-5-1

Birinapant (400 mg, 0.50 mmol), di-tert-butyl dicarbonate (273 mg, 1.25 mmol), and triethylamine (152 mg, 1.50 mmol) were dissolved in THF (10 mL), reacted overnight at room temperature, and extracted with water (10 mL) and ethyl acetate (20 mL). The organic phase was washed with a saturated salt solution, dried over anhydrous sodium sulfate, filtered, concentrated, and purified by silica-gel column chromatography (DCM:MeOH-20:1) to give a white solid I-5-1 (412 mg, 83%).

$^1$H NMR (400 MHZ, DMSO-d6) δ 11.92 (s, 2H), 8.17 (s, 2H), 7.83 (dd, J=8.7, 5.5 Hz, 2H), 7.46 (dd, J=9.8, 1.9 Hz, 2H), 6.93 (td, J=9.7, 2.3 Hz, 2H), 5.65 (d, J=3.0 Hz, 2H), 4.94-4.35 (m, 6H), 4.23 (s, 2H), 3.87 (dd, J=11.1, 4.4 Hz, 2H), 3.68 (d, J=10.8 Hz, 2H), 3.56-3.39 (m, 4H), 2.79 (s, 6H), 1.91-1.67 (m, 8H), 1.40 (s, 18H), 1.35 (dd, J=10.1, 4.7 Hz, 6H), 1.01 (s, 6H).

(2) Preparation of Compound I-5-2

Compound I-5-1 (312 mg, 0.31 mmol), acetic anhydride (76 mg, 0.74 mmol), triethylamine (125 mg, 1.24 mmol), and DMAP (8 mg, 0.06 mmol) were dissolved in THF (10 mL), reacted overnight at room temperature, and extracted with water (10 mL) and ethyl acetate (20 mL). The organic phase was washed with a saturated salt solution, dried over anhydrous sodium sulfate, filtered, concentrated, and purified by silica-gel column chromatography (PE:EA=1:1) to give a white solid I-5-2 (280 mg, 83%).

$^1$H NMR (400 MHZ, CDCl$_3$) δ 11.56 (s, 2H), 7.54 (dt, J=10.1, 5.1 Hz, 4H), 6.88 (td, J=9.4, 2.3 Hz, 2H), 5.49 (t, J=5.1 Hz, 2H), 4.86-4.60 (m, 4H), 4.50 (t, J=9.3 Hz, 2H), 4.19 (d, J=7.6 Hz, 2H), 3.84 (d, J=12.4 Hz, 2H), 3.56 (dd, J=14.4, 2.2 Hz, 2H), 3.34 (dd, J=14.3, 12.0 Hz, 2H), 2.88 (s, 6H), 2.33 (s, 6H), 2.13-1.88 (m, 6H), 1.78 (tt, J=14.6, 7.3 Hz, 2H), 1.51 (s, 18H), 1.38 (d, J=7.2 Hz, 6H), 1.03 (t, J=7.3 Hz, 6H).

(3) Preparation of Compound I-5-S

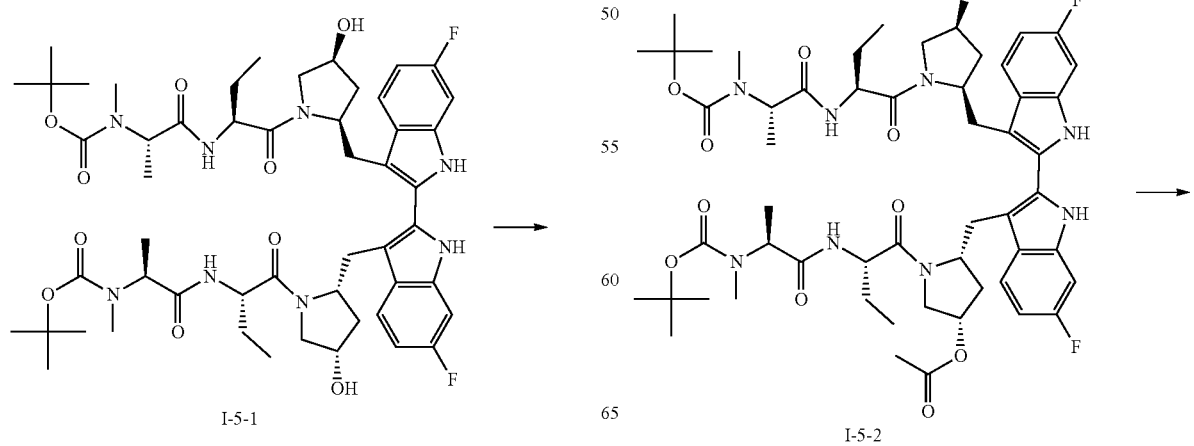

I-5-1 I-5-2

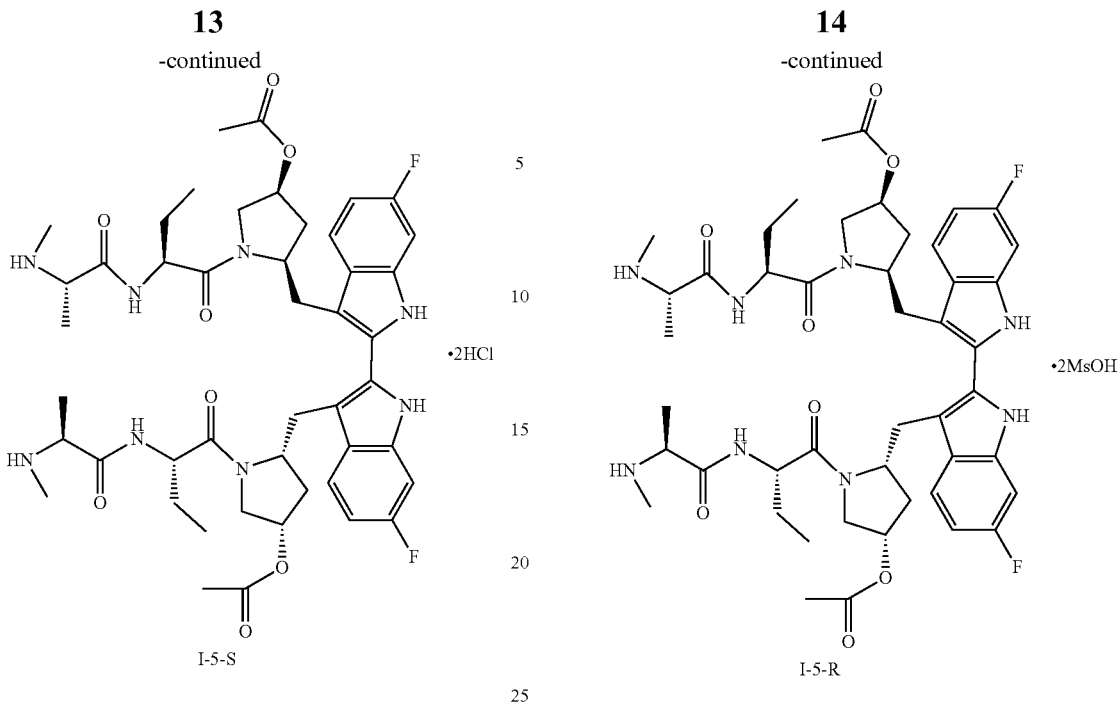

I-5-S    I-5-R

Compound I-5-2 (280 mg, 0.26 mmol) was dissolved in DCM (10 mL). HCl (g) was charged into the reaction mixture at room temperature. After the reaction was detected by LC-MS to be completed, the reaction mixture was filtered. The filter cake was washed with diethyl ether (5 mL×2), and drained to give a yellowish green solid I-5-S (198 mg, 80%).

$^1$H NMR (400 MHZ, DMSO-$d_6$) δ 11.48 (s, 2H), 9.40-9.29 (m, 2H), 8.92 (dd, J=15.2, 7.2 Hz, 4H), 7.95 (dd, J=8.6, 5.6 Hz, 2H), 7.19 (dd, J=9.9, 2.2 Hz, 2H), 6.96 (td, J=9.8, 2.3 Hz, 2H), 5.12 (s, 2H), 4.53-4.30 (m, 4H), 3.96-3.80 (m, 4H), 3.66 (d, J=12.0 Hz, 2H), 3.49-3.29 (m, 2H), 2.89 (t, J=12.4 Hz, 2H), 2.49 (s, 6H), 2.48 (s, 6H), 1.90 (t, J=6.5 Hz, 2H), 1.79 (td, J=13.6, 6.8 Hz, 2H), 1.67 (dt, J=21.6, 7.5 Hz, 2H), 1.45-1.39 (m, 8H), 0.96 (t, J=7.4 Hz, 6H); m/z (ESI) [M-2HCl+Na]$^+$=913.5, [M-2HCl+H]$^+$=891.5.

The CuKα-XPRD pattern of Compound I-5-S was tested as shown in the FIGURE, indicating that the Compound I-5-S was an amorphous crystal.

(4) Preparation of Compound I-5-R:

Compound I-5-R was prepared by the same method for preparing the Compound I-5-S. The Compound I-5-2 was deprotected with methanesulfonic acid to obtain its mesylate I-5-R.

Deprotection with an acid could produce a corresponding salt. According to Example 1(4), the corresponding acid, acyl chloride or anhydride was used, and then deprotection was carried out with a corresponding acid to produce a corresponding salt of the target product I.

(5) Preparation of Compound I-5:

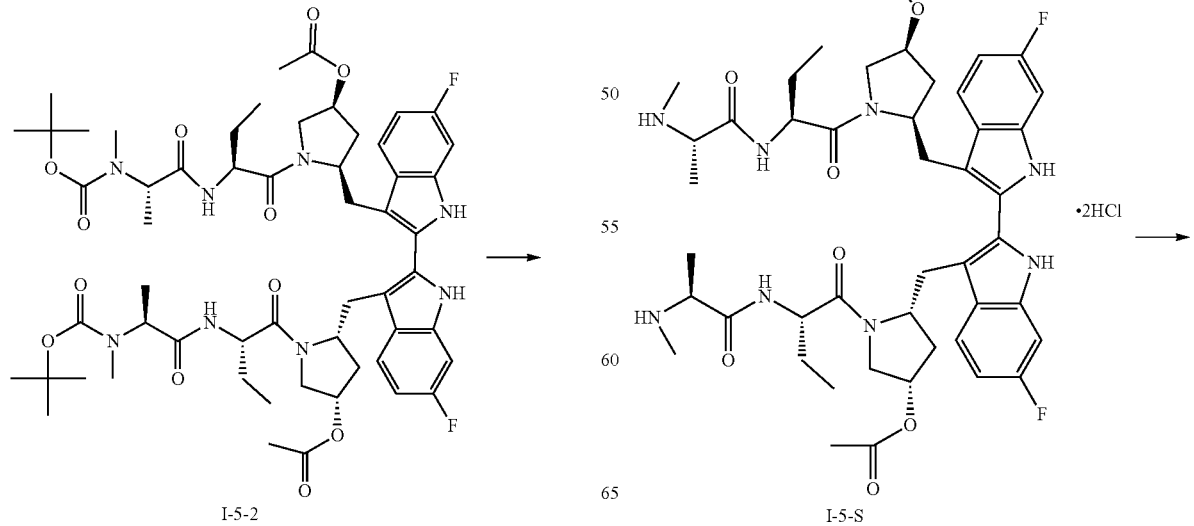

I-5-2    I-5-S

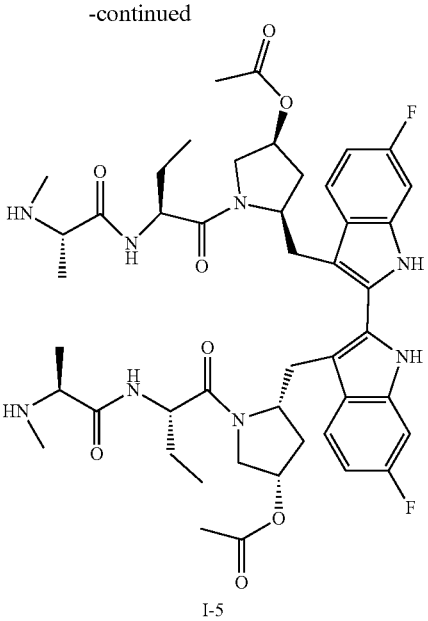

I-5

Compound I-5-S (100 mg) was mixed with an aqueous sodium bicarbonate solution (2N, 20 mL). The mixture was extracted with dichloromethane (20 mL). The organic solution was dried over Na$_2$SO$_4$, and the solvent was evaporated to give a target product I-5.

(6) Preparation of Compound A:

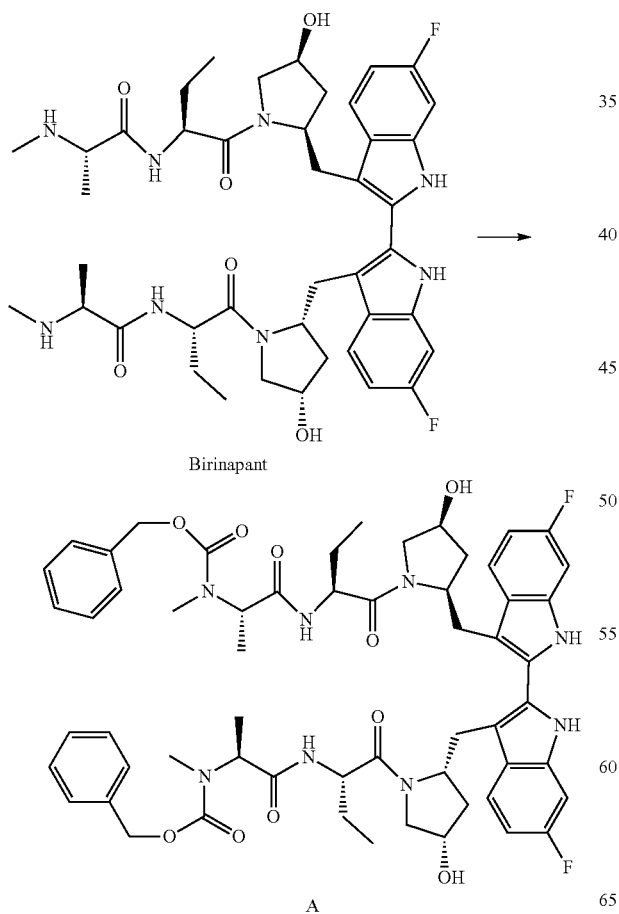

Birinapant

A

Birinapant (400 mg, 0.50 mmol) and pyridine (198 mg, 2.50 mmol) were dissolved in dichloromethane (5 mL). Chlorine benzyl formate (186 mg, 1.10 mmol) was dissolved in dichloromethane (5 mL), and added dropwise to the reaction system at 0° C. under nitrogen protection. After dropwise addition, the temperature was raised to room temperature, and the mixture was reacted overnight and extracted with water. The organic phase was washed with a saturated salt solution, dried over anhydrous sodium sulfate, filtered, concentrated, and purified by silica-gel column chromatography (DCM:MeOH=10:1) to give 338 mg of yellowish solid A, with a yield of 75%.

$^1$H NMR (400 MHZ, DMSO) δ 11.96 (s, 2H), 8.35 (s, 2H), 7.83 (dd, J=8.6, 5.5 Hz, 2H), 7.48 (dd, J=9.8, 2.0 Hz, 2H), 7.44-7.26 (m, 10H), 6.93 (td, J=9.7, 2.2 Hz, 2H), 5.65 (d, J=2.8 Hz, 2H), 5.11 (s, 4H), 4.78 (s, 2H), 4.45 (d, J=24.2 Hz, 4H), 4.23 (s, 2H), 3.88 (d, J=7.0 Hz, 2H), 3.68 (d, J=11.0 Hz, 2H), 3.48 (dd, J=29.4, 14.0 Hz, 4H), 2.88 (s, 6H), 2.06-1.64 (m, 8H), 1.41 (s, 6H), 0.98 (s, 6H).

(7) Preparation of Compound B:

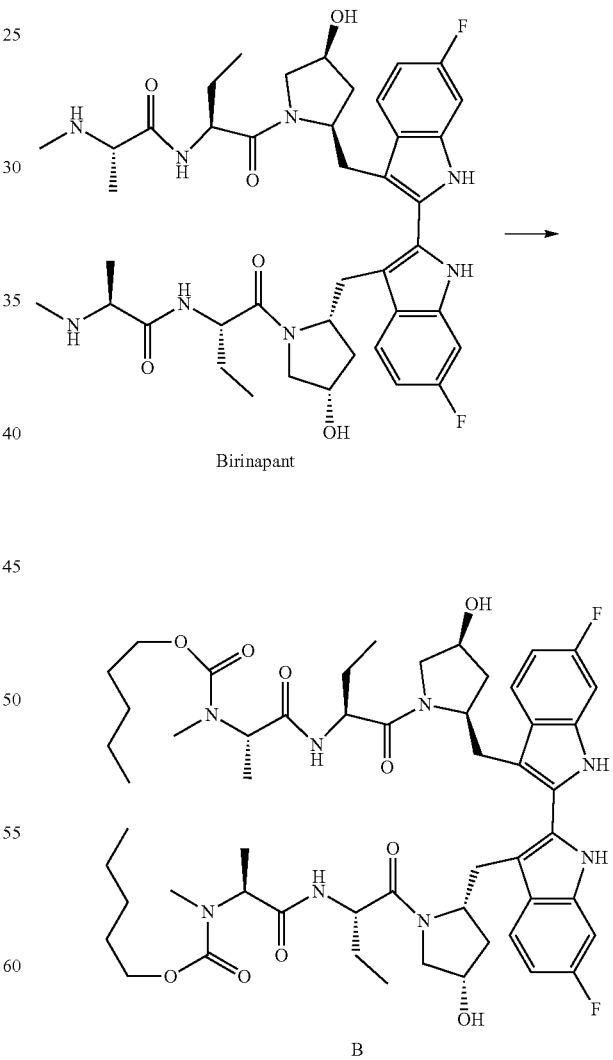

Birinapant

B

Compound B was prepared by the method for preparing Compound A.

(8) Preparation of Compound I-6-S:

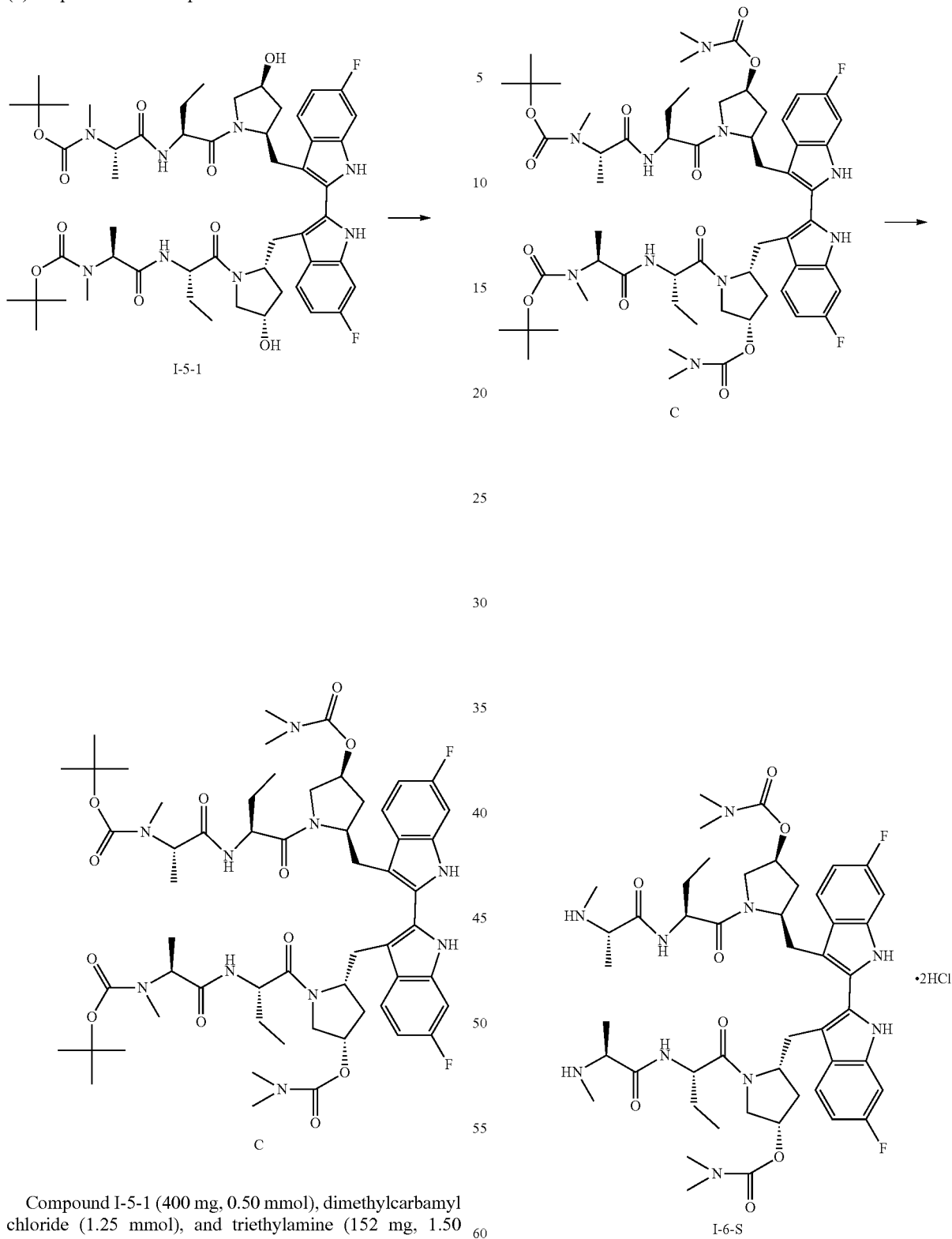

Compound I-5-1 (400 mg, 0.50 mmol), dimethylcarbamyl chloride (1.25 mmol), and triethylamine (152 mg, 1.50 mmol) were dissolved in THF (10 mL), reacted overnight at room temperature, and extracted with water (10 mL) and ethyl acetate (20 mL). The organic phase was washed with a saturated salt solution, dried over anhydrous sodium sulfate, filtered, concentrated, and purified by silica-gel column chromatography (DCM:MeOH=20:1) to give Compound C.

Compound C (0.26 mmol) was dissolved in DCM (10 mL). HCl (g) was charged into the reaction mixture at room temperature. After the reaction was detected by LC-MS to be completed, the reaction mixture was filtered. The filter cake was washed with diethyl ether (5 mL×2), and drained to give a Compound I-6-S.

(9) Preparation of Compound I-7-S:

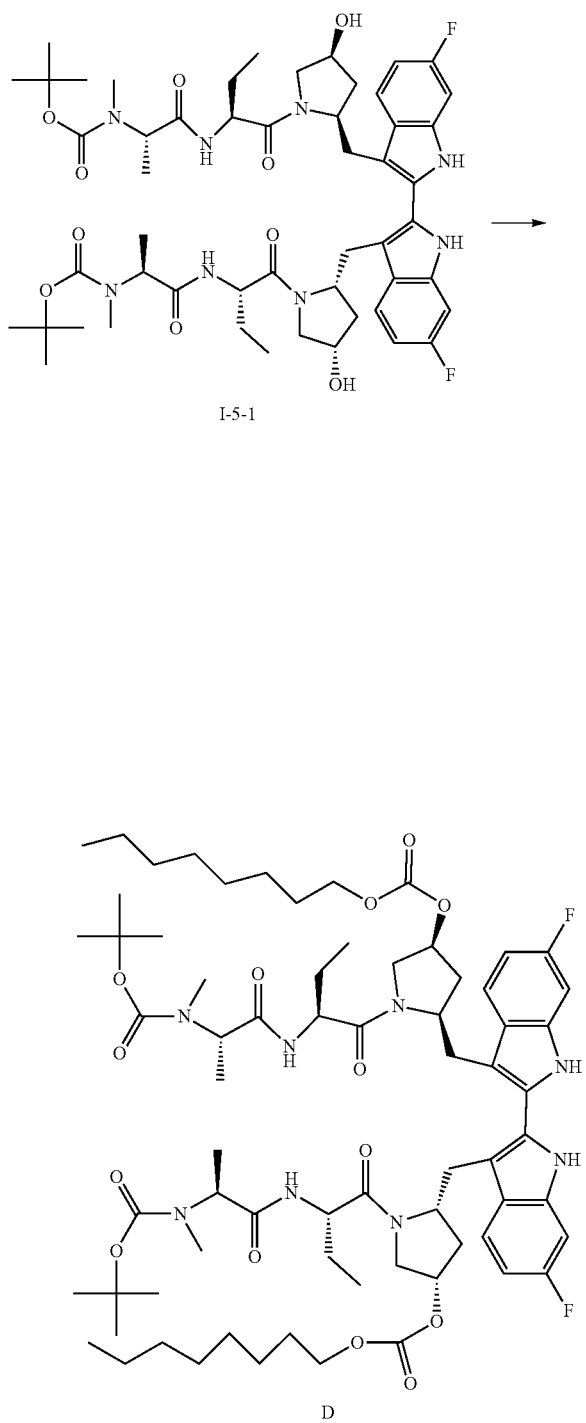

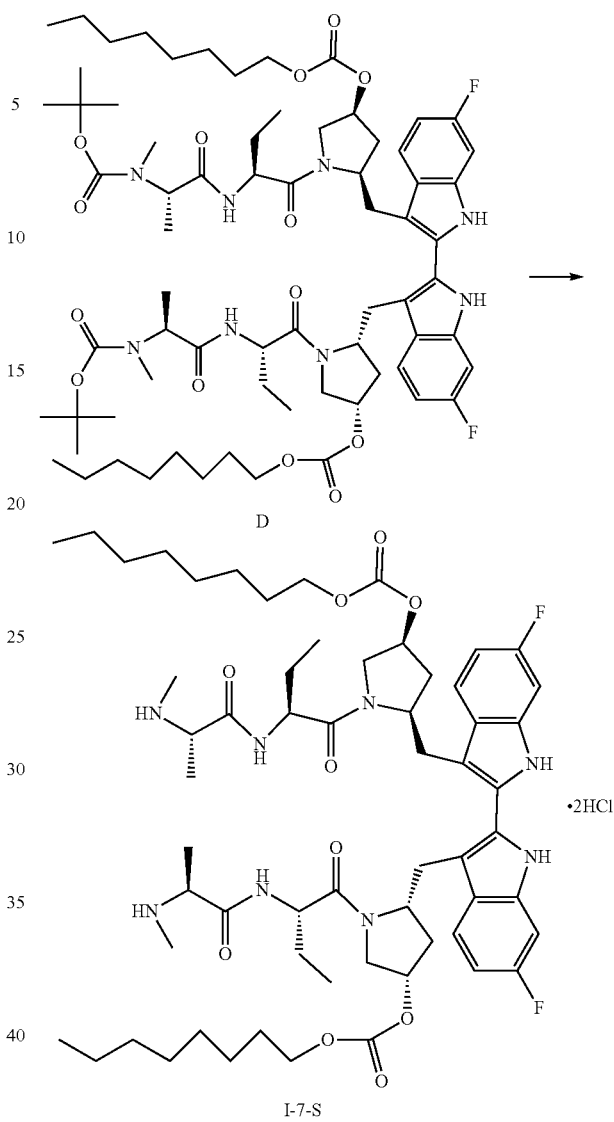

Compound I-5-1 (400 mg, 0.50 mmol), n-octyl chloroformate (1.25 mmol), and triethylamine (152 mg, 1.50 mmol) were dissolved in THF (10 mL), reacted overnight at room temperature, and extracted with water (10 mL) and ethyl acetate (20 mL). The organic phase was washed with a saturated salt solution, dried over anhydrous sodium sulfate, filtered, concentrated, and purified by silica-gel column chromatography (DCM:MeOH=20:1) to give Compound D.

Compound D (0.26 mmol) was dissolved in DCM (10 mL). HCl (g) was charged into the reaction mixture at room temperature. After the reaction was detected by LC-MS to be completed, the reaction mixture was filtered. The filter cake was washed with diethyl ether (5 mL×2), and drained to give a Compound I-7-S.

Example 2. Pharmacokinetic Study

1. Formulation of preparation and dosing: An appropriate amount of the test sample was precisely weighed, and mixed with an appropriate volume of a solvent (5% DMSO/5% Solutol/90% water) to obtain a clear solution or a homogeneous suspension. The preparation was administered to animals within 4 hours after formulation. The dosage formulation would be administered by oral gavage in accordance with facility standard operating procedures. The dosage volume would be determined by the body weights of the animals collected on the morning of administering.

2. Blood collection: Blood (approx. 0.2 ml per point in time) would be drawn each time from the jugular vein of every animal. All blood samples would be transferred to pre-cooled commercial EDTA-K2 test tubes, and kept on wet ice until they were centrifuged.

3. Plasma processing: Blood samples would be centrifuged (3200 rpm, 10 min) at approximately 4° C. Plasma was collected separately and transferred to pre-labeled PP tubes in wet ice at each point in time, and then immediately precipitated by ACN (6 IS) (the ratio of plasma:ACN was 1:4). Centrifugation (10 min, 12,000 rpm) was carried out again to obtain a supernatant. The supernatant was quickly frozen on dry ice and kept at −70±10° C. before LC/MS/MS analysis.

4. Liver processing: Liver tissues were collected at each point in time, washed twice with pre-cooled deionized water, and dried with filter paper. Liver tissues were immediately homogenized with 10-times volume of a methanol-water solution (1:2, v/v). After homogenization, a portion of liver tissue homogenate (e.g., 200 µL of homogenate) was immediately measured. After precipitated on wet ice, the samples were centrifuged, and a supernatant was collected and stored in a refrigerator at −70±10° C. before LC-MS/MS analysis. From the remaining liver homogenate, 800 µL of the homogenate was measured as a spare.

Compounds Birinapant (5 mg/kg) and I-5-S (5.97 mg/kg) were intravenously injected (i.v.) into rats, respectively. Rat plasma and liver samples were collected at points in time of 0.25, 0.5, 1, 2, 4, 8, 12, 24 h, 48 h, and 72 h, respectively, and tested by LC-MS/MS according to the above-mentioned method to determine the concentrations of the in vivo active metabolites of Birinapant and I-5-S in plasma and liver (see Tables 1 and 2).

Compound I-5-S was metabolized into the active pharmaceutical ingredient Birinapant in animals:

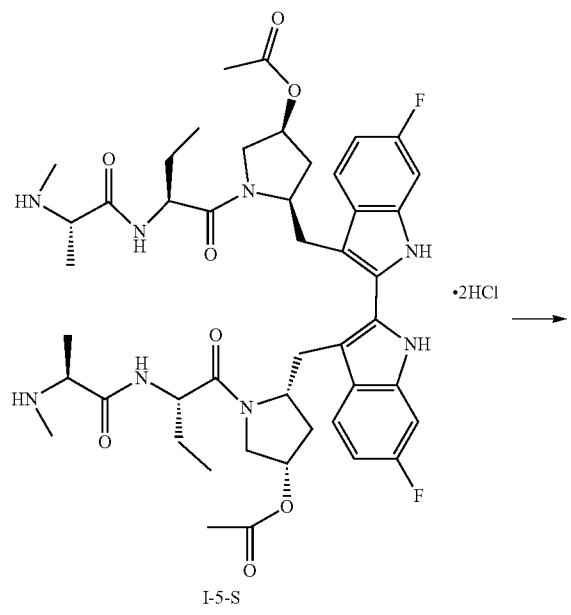

I-5-S

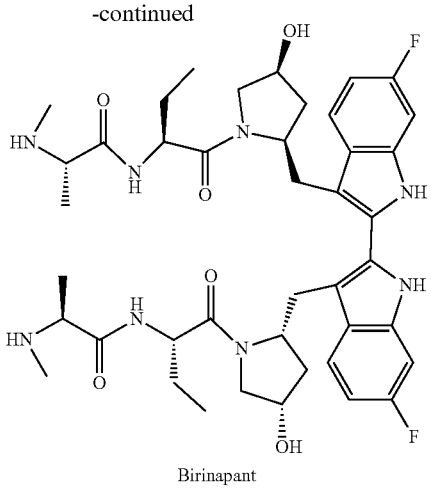

Birinapant

After the solution of compound Birinapant was intravenously injected into rats, the concentrations of the active compound Birinapant in the rats were determined in the plasma and liver, respectively (see Table 1).

After the solution of compound I-5-S was intravenously injected into rats, the concentrations of the active compound Birinapant in the rats were determined in the plasma and liver, respectively (see Table 2).

TABLE 1

Distribution of Drug Birinapant in Plasma and Liver after i.v. Birinapant in Rats

| PK Parameters | Plasma | Liver |
| --- | --- | --- |
| Rsq_adj | 0.854 | 0.975 |
| No points used for $T_{1/2}$ | 5.00 | 6.00 |
| $C_0$(ng/mL) | 3473 | — |
| $C_{max}$ (ng/mL or ng/g) | 3473 | 4279 |
| $T_{max}$ (h) | — | 0.250 |
| $T_{1/2}$ (h) | 14.6 | 22.9 |
| $Vd_{ss}$ (L/kg) | 36.3 | — |
| Cl (mL/min/kg) | 76.3 | — |
| $T_{last}$ (h) | 48.0 | 72.0 |
| $AUC_{0-24}$ (ng · h/mL) or (ng · h/g) | 967 | 40566 |
| $AUC_{0-last}$ (ng · h/mL) or (ng · h/g) | 1042 | 66712 |
| $AUC_{0-inf}$ (ng · h/mL) or (ng · h/g) | 1092 | 76641 |
| $MRT_{0-last}$ (h) | 4.99 | 23.2 |
| $MRT_{0-inf}$ (h) | 7.94 | 33.8 |
| $AUC_{Extra}$ (%) | 4.60 | 13.0 |
| $AUMC_{Extra}$ (%) | 40.1 | 40.2 |
| AUC Ratio | | 64.0 |

TABLE 2

Distribution of Drug Birinapant in Plasma and Liver after i.v. I-5-S in Rats

| | Birinapant | |
| --- | --- | --- |
| PK Parameters | Plasma | Liver |
| Rsq_adj | 0.996 | 0.771 |
| No points used for $T_{1/2}$ | 4.00 | 4.00 |
| $C_0$(ng/mL) | — | — |
| $C_{max}$ (ng/mL or ng/g) | 205 | 3111 |
| $T_{max}$ (h) | 0.083 | 8.00 |
| $T_{1/2}$ (h) | 35.3 | 32.6 |
| $Vd_{ss}$ (L/kg) | — | — |
| Cl (mL/min/kg) | — | — |
| $T_{last}$ (h) | 72.0 | 72.0 |
| $AUC_{0-last}$ (ng · h/mL) or (ng · h/g) | 504 | 97796 |

TABLE 2-continued

Distribution of Drug Birinapant in Plasma and Liver after i.v. I-5-S in Rats

| PK Parameters | Birinapant | |
| --- | --- | --- |
| | Plasma | Liver |
| $AUC_{0-inf}$ (ng · h/mL) or (ng · h/g) | 666 | 134133 |
| $MRT_{0-last}$ (h) | 27.6 | 27.7 |
| $MRT_{0-inf}$ (h) | 50.8 | 50.4 |
| $AUC_{Extra}$ (%) | 24.3 | 27.1 |
| $AUMC_{Extra}$ (%) | 58.9 | 61.5 |
| AUC Ratio (L/P) | | 194 |

From the data listed in Tables 1 and 2, it could be seen that after a compound Birinapant solution was intravenously injected into rats, the initial concentration of the drug Birinapant in the plasma reached 3473 (ng.h/g), which would easily cause side effects on the circulating system. After a solution of the Birinapant prodrug, i.e., compound I-5-S was intravenously injected into rats, (1) the maximum concentration of the drug Birinapant in the plasma was reduced to 205 (ng/ml or ng/g), reducing by 94% in comparison to direct use of Birinapant; (2) a total drug exposure in the plasma was reduced by 49% in comparison to direct use of Birinapant; and (3) the total exposure of the active drug Birinapant released in liver reached 97796 (ng.h/g), which was 194 times that in the plasma and 2.4 times that of direct use of Birinapant.

The experimental results show that the compound represented by formula I of the present disclosure can effectively concentrate the drug in the liver, exhibiting a significant liver targeting characteristic, and can reduce the drug dosage while improving the therapeutic effects on liver diseases, and reduce the drug concentration in the circulating system, thereby reducing the toxic and side effects on the organs related to the circulating system. Reduction in side effects of the drug on the circulating system can effectively improve the drug tolerance in clinical, improve the therapeutic effects on other cancers, such as hysteroma, lymphoid leukemia, solid tumors, myelodysplasia syndrome, or head and neck tumors, and expand its clinical applications.

Under the same conditions as described above, after rats were orally or intravenously injected with a solution of Compound A or B, the concentrations of Compound A or B and drug Birinapant in rats were measured in plasma and liver, respectively. However, Compounds A and B, no matter whether administered orally or intravenously to rats, could not be degraded by in vivo esterase at all to release the active drug Birinapant, and Compounds A and B were 100% excreted and recovered. Therefore, such prodrugs would have no value of application for Birinapant.

The invention claimed is:

1. A method for treating hepatitis B or liver cancer, comprising:
   giving an effective amount of a compound of formula I or a pharmaceutically acceptable salt thereof, or a pharmaceutical composition containing one or more compounds of formula I, or pharmaceutically acceptable salts thereof, and a pharmaceutically acceptable carrier, wherein the compound of formula I is

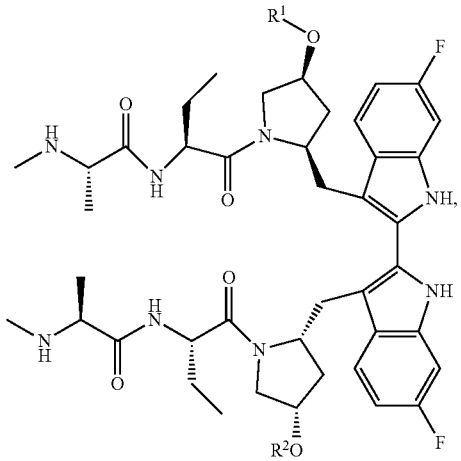

wherein:
   $R^1$ and $R^2$ are each independently selected from: hydrogen or —COR', where $R^1$ and $R^2$ are not hydrogen at the same time; and
   R' is selected from: hydrogen, or alkyl.

2. The method according to claim 1, wherein
   "alkyl" in the "alkyl" is $C_1$-$C_{20}$ linear or branched alkyl, $C_1$-$C_{10}$ linear or branched alkyl, $C_1$-$C_5$ linear or branched alkyl, or selected from the group consisting of: methyl, ethyl, n-propyl, isopropyl, n-butyl, isobutyl, tert-butyl, sec-butyl, and n-pentyl.

3. The method according to claim 1, wherein:
   R' is selected from the group consisting of: hydrogen, methyl, ethyl, n-propyl, isopropyl, n-butyl, isobutyl, sec-butyl, and n-pentyl; and
   $R^1$ and $R^2$ are each independently selected from the group consisting of: formyl, acetyl, propionyl, isopropionyl, butyryl, and isobutyryl.

4. The method according to claim 1, wherein the pharmaceutically acceptable salt is a salt formed of a compound of formula I and an acid;
   wherein the acid is selected from the group consisting of an inorganic acid and an organic acid;
   wherein the inorganic acid is selected from the group consisting of hydrochloric acid, hydrobromic acid, hydroiodic acid, sulfuric acid, nitric acid, phosphoric acid, and carbonic acid; and
   wherein the organic acid is selected from the group consisting of formic acid, ascorbic acid, acetic acid, propionic acid, oxalic acid, malonic acid, succinic acid, fumaric acid, maleic acid, lactic acid, malic acid, citric acid, tartaric acid, gluconic acid, hydrogen tartaric acid, glucuronic acid, picric acid, methanesulfonic acid, ethanesulfonic acid, p-toluenesulfonic acid, benzoic acid, benzenesulfonic acid, p-bromobenzenesulfonic acid, glutamic acid, salicylic acid, and pamoic acid.

5. The method according to claim 1, wherein the compound of formula I is selected from the following compounds:

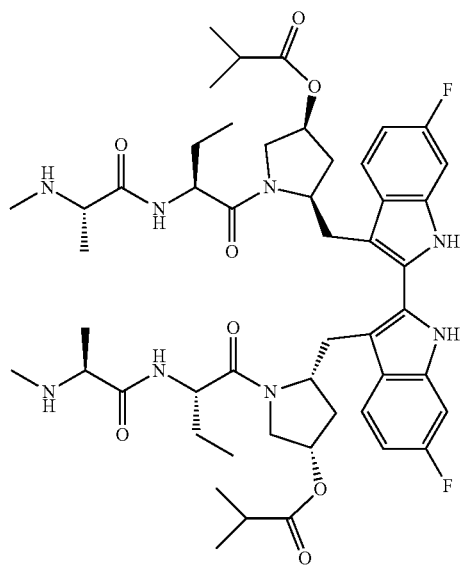
I-1
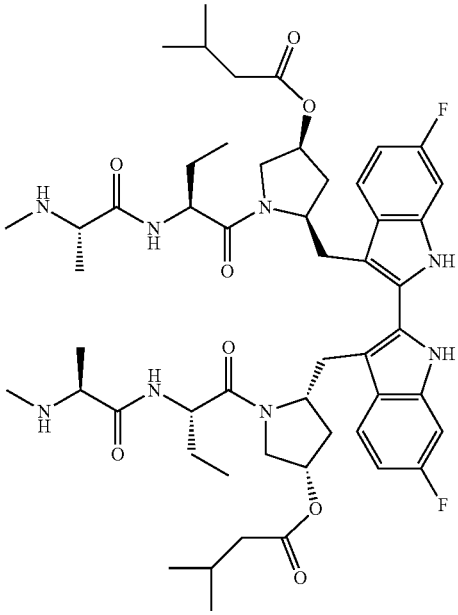
I-3
I-2
I-4

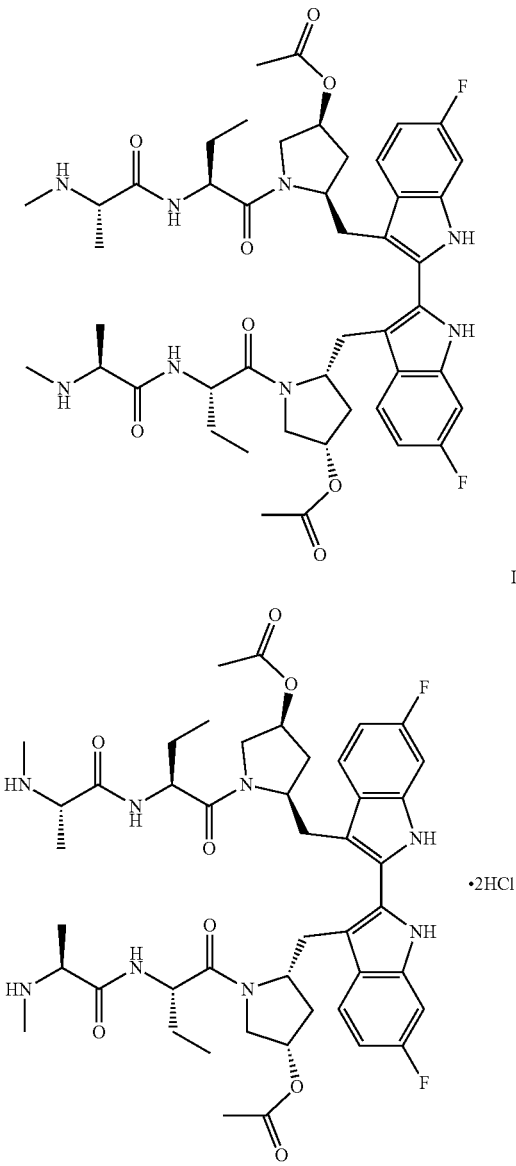

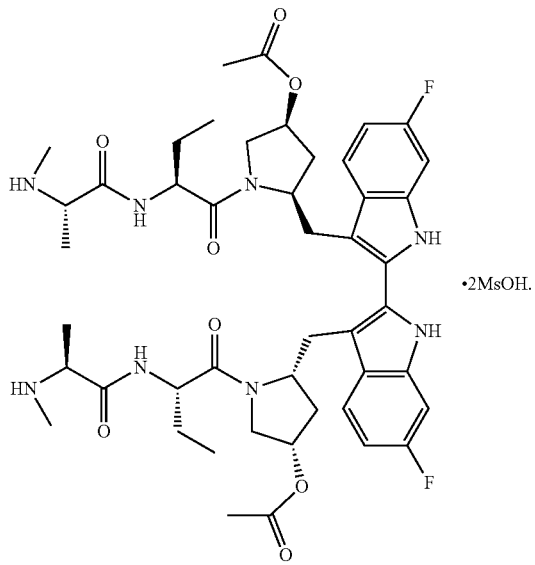

6. The method according to claim 5, which is a compound I-5-S in an amorphous form.

7. The method according to claim 1, wherein a dosage form of the pharmaceutical composition is selected from the group consisting of an oral preparation and an injection preparation;

the oral preparation is selected from the group consisting of a solid preparation and a liquid preparation;

the solid preparation is selected from the group consisting of tablets, powders, granules, and capsules; and the liquid preparation is selected from the group consisting of water or oil suspensions, and syrups.

* * * * *